United States Patent [19]

Budzich

[11] 3,771,837
[45] Nov. 13, 1973

[54] THREE SLOPE PROPORTIONING VALVE
[75] Inventor: Tadeusz Budzich, Cleveland, Ohio
[73] Assignee: The Weatherhead Company, Cleveland, Ohio
[22] Filed: Dec. 20, 1971
[21] Appl. No.: 209,762

[52] U.S. Cl............... 303/6 C, 303/22 R, 188/349, 60/54.4 E
[51] Int. Cl............................................. B60t 13/00
[58] Field of Search............... 303/6 C, 22 A, 22 R; 188/349; 60/54.5 E

[56] References Cited
UNITED STATES PATENTS

| 3,501,203 | 3/1970 | Falk | 303/6 C |
| 3,672,728 | 6/1972 | Keady et al. | 303/6 C |
| 3,375,852 | 4/1968 | Milster | 303/6 C X |
| 3,489,465 | 1/1970 | Bueler | 303/6 C X |
| 3,669,504 | 6/1972 | Stokes | 303/6 C |

Primary Examiner—Duane A. Reger
Assistant Examiner—D. C. Butler
Attorney—Harold F. McNenny et al.

[57] ABSTRACT

A three slope proportioning valve for a motor vehicle hydraulic brake system is normally open to permit free fluid flow from an inlet port to an outlet port below a first predetermined inlet port pressure. At the first predetermined pressure, a first valve head is displaced by operation of a differential area piston to a position to cooperate with a valve seat member. the first valve head throttles fluid flow from the inlet port to the outlet port and maintains a first predetermined proportional relation between increases in inlet and outlet port pressure when the inlet port pressure is greater than the first predetermined pressure and less than a second predetermined pressure. At the second predetermined pressure a second valve head moves toward the valve seat and the first valve head moves away from the valve seat. The second valve head cooperates with the valve seat to throttle fluid flow from the inlet port to the outlet port and maintain a second predetermined proportional relation between increases in inlet port pressure and increases in outlet port pressure above the second predetermined pressure level.

14 Claims, 2 Drawing Figures

INVENTOR.
TADEUSZ BUDZICH
BY
McNENNY, FARRINGTON, PEARNE & GORDON
ATTORNEYS

THREE SLOPE PROPORTIONING VALVE

BACKGROUND OF THE INVENTION

This invention relates generally to pressure regulating valves, and more specifically to pressure proportioning valves that are operable to maintain the outlet pressure a differential below the inlet pressure after a predetermined inlet pressure has been reached or exceeded. Still more specifically, this invention relates to such pressure proportioning valves that are particularly adapted for use in motor vehicle braking systems and are known as three slope pressure proportioning valves.

In automaobile hydraulic brake systems, it is sometimes desirable to provide a lower fluid pressure to the rear wheel brakes than to the front wheel brakes under severe braking conditions. This prevents premature lock-up of the rear wheel brakes of the automobile, which might otherwise be caused by a weight transfer from the rear wheels to the front wheels upon rapid deceleration. Such premature lock-up of the rear wheel brakes of an automobile may also tend to result under certain conditions when caliber disc type brakes are used on the front wheels of the vehicle and drum type brakes are used on the rear wheels, due to the self-energizing action of the drum type brakes.

Prior art proportioning valves for providing this pressure differential include two slope proportioning valves and three slope proportioning valves. The two slope valves generally provide open fluid pressure communication between inlet and outlet below a predetermined pressure level, and provide a single proportional relation between increases in inlet pressure and increases in outlet pressue above the predetermined pressure. Three slope proportioning valves are similar to two slope valves, but further include means to maintain second proportional relation between increases in inlet pressure and increases in outlet pressure after a second predetermined pressure level is reached. In this manner, the three slope proportioning valves are able to maintain the relation between front and rear wheel brake pressures closer to the theoretical optimum relation over the entire range of operation of the brake system.

SUMMARY OF THE INVENTION

The invention provides a simple, inexpensive and reliable three slope proportioning valve which is particularly adapted for use in a motor vehicle dual braking system to regulate the fluid pressure supplied to the brakes.

The preferred embodiment of this invention provides a pressure proportioning valve which may be interposed in a hydraulic brake system between a master cylinder and the slave or wheel cylinders of the rear wheels. When the hydraulic pressures of the system are relatively low, as would occur under very moderate braking conditions or during advancement of the brake shoes or pads toward the braking surfaces, the valve permits equalization of the outlet pressure supplied to the slave cylinders and the inlet pressure supplied from the master cylinder.

When the system pressure increases above a first predetermined pressure level, as would occur under more severe braking conditions, the invention provides a first throttling type proportioning valve which maintains throttled fluid pressure communication between the inlet port and the outlet port. The first valve provides unlimited make-up flow to the slave cylinders from the master cylinder and maintains a first predetermined proportional relation between increases in the inlet port pressure and increases in the outlet port pressure when the inlet port pressure is greater than the first predetermined pressure and less than a second predetermined pressure.

As used herein, the term "inlet port" or "inlet" refers to all interior portions of a valve upstream of the valve throttling area, and the term "outlet port" or "outlet" refers to all interior portions of the valve downstream of the valve throttling area. The term "throttling type" proportioning valve refers to a proportioning valve in which throttled fluid pressure communication is established between the inlet port and the outlet port to provide substantially unlimited fluid flow from the inlet port to the outlet port.

When the inlet pressure from the master cylinder reaches the second predetermined pressure level, such as would occur under very severe braking conditions, the invention provides a second throttling type proportioning valve. The second valve maintains throttled fluid pressure communication between the inlet and outlet ports and maintains a second predetermined proportional relation between increases in inlet port pressure and increases in outlet pressure above the second predetermined inlet port pressure level. According to other features and advantages of the invention, the valve includes a body having a bore therethrough with an inlet port at one end of the bore and an outlet port at the other end of the bore. A differential area piston is slidably disposed in the bore, and a passage extends axially through the differential area piston. A first annular valve head is slidably disposed in the passage. The portion of the differential area piston surrounding one end of the passage forms a second annular valve head. The first valve head is spring biased to a position closer to the valve seat than the second valve head when the inlet port pressure is less than the first predetermined pressure.

When the first predetermined pressure is reached, the differential area piston moves the first valve head into a position of cooperating adjacency to the valve seat. The first valve head, by operation of the differential area piston, maintains the first proportional relation between increases in inlet port pressure and increases in outlet port pressure until the second predetermined pressure is reached. When the second predetermined pressure is reached, the second valve head moves by operation of the differential area into a position of cooperating adjacency to the valve seat to maintain the second proportional relation between increases in inlet pressure and increases in outlet port pressure. When the second valve head is moved to its position adjacent the valve seat, the first valve head is moved away from the valve seat by operation of the differential inlet and outlet pressures.

DESCRIPTION OF THE PREFERRED EMBODIMENT

Figure 1:
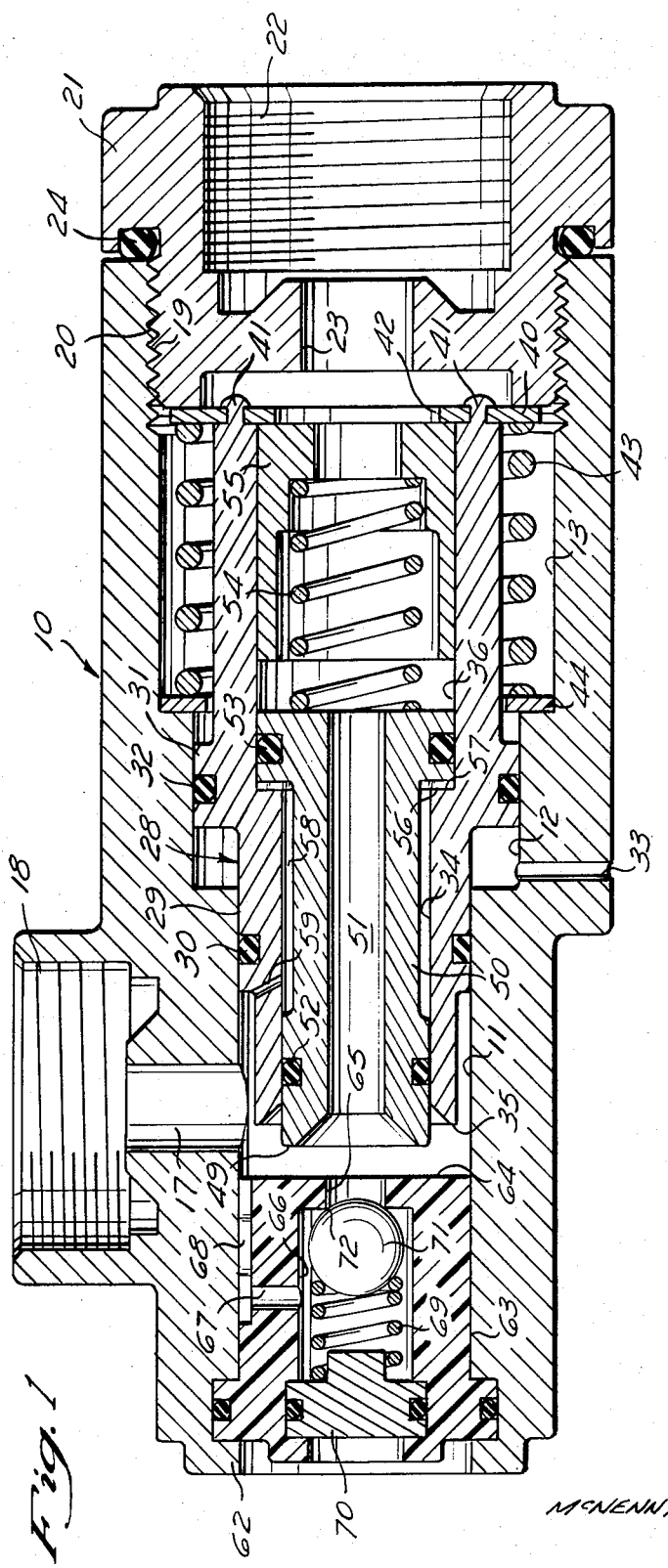
FIG. 1 is a cross sectional, side elevational view of a valve according to the preferred embodiment of this invention.

Referring now to the drawings in greater detail, FIG. 1 shows a three slope proportioning valve which is particularly adapted for use in a motor vehicle dual braking system. When the valve is used for such purposes in an automobile, it is interposed between the brake system master cylinder and the hydraulic line leading to the slave or wheel cylinders of the rear wheels to regulate the fluid pressure supplied to the rear brakes.

The brake pressure proportioning valve according to the preferred embodiment of the invention includes a housing 10 having a bore 11 extending axially threrethrough, a first counterbore 12, and a second counterbore 13. As viewed in FIG. 1, the left end of body 10 has a passage 17 providing open fluid pressure communication between a threaded inlet opening 18 and the bore 11. The inlet opening 18 is adapted to receive an inverred flare type fitting to receive fluid pressure supplied from the master cylinder of the motor vehicle.

The right end of body member 10, as viewed in FIG. 1, is provided with an internally threaded end portion 19 which threadedly receives an externally threaded portion 20 of an end fitting 21. The end fitting 21 is provided with a threaded outlet opening 22, and a passage 23 establishes open fluid pressure communication between the outlet opening 22 and the second counterbore 13. Outlet opening 22 is adapted to receive an inverted flare type fitting to supply fluid pressure to the slave cylinders of the rear wheel brakes. An elastomeric O-ring seal 24 is provided between the body member and the end fitting 21 to prevent fluid leakage.

A differential area piston 28 is slidably disposed within the body member 10. The differential area piston 28 includes a smaller diameter portion 29, which carries an O-ring seal 30 and is slidably and sealingly disposed in bore 11. A larger diameter portion 31 of the differential area piston 28 carries an O-ring seal 32 and is slidably and sealingly disposed in the first counterbore 12. The annular cross sectional area of the differential between the smaller diameter portion 29 and the larger diameter portion 31 is vented to atmospheric pressure by a suitable vent passage 33. A passage 34 extends axially through the differential area piston 28, nd the annular portion of the differential area piston 28 surrounding the left end of the passage 34 provides an annular valve head 35.

The passage 34 of the differential area piston 28 extends from the valve head 35 and includes a larger diameter portion 36. The right end of differential area piston 28 carries a round, generally flat abutment plate 40. The abutment plate 40 is secured to the differential area piston 28 by suitable circumferentially spaced projections 41 and includes a fluid passage 42. A coil spring 43 acts between a washer 44 and the abutment plate 40 to normally bias the differential area piston 28 to the right to a first predetermined position as shown in FIG. 1.

Another annular valve head 49 is slidably disposed within the passage 34 of the differential area piston 28. The valve head 49 includes a spool portion 50 and a passage 51 extending therethrough. The spool portion 50 carries an O-ring seal 52 for sealing engagement with the passage 34 and a seal 53 for sealing engagement with the larger diameter portion 36 of the passage 34. A coil spring 54 acts between the spool portion 50 of the valve head 49 and an abutment member 55 to urge the valve head 49 to the predetermined position shown in FIG. 1 in which a fluted shoulder 56 of the spool portion 50 engages a shoulder 57 of the differential area piston 28. An annular space 58 between the spool portion 50 and the passage 34 is in free fluid pressure communication with the inlet opening 18 by a passage 59.

A valve seat element 63 is held in the left end of bore 11 by a suitable spun-over portion 62 of the housing 10. The element 63 is preferably of nylon, and includes a radially extending valve seat surface 64 which cooperates with the valve heads 35 and 49 in a manner described in detail below. A passage 65 extends to the left from the valve seat 64 to a larger diameter passage portion 66. A radially extending passage 67 and a fluted portion 68 of the element 63 establish open fluid pressure communication between the larger diameter passage portion 66 and the inlet passage 17. A coil spring 69 acts between an abutment member 70 and a one-way return flow ball type check valve 71 to urge the check valve 71 against a suitable valve seat 72.

In a preferred installation of the valve shown in FIG. 1, the inlet opening 18 is hydraulically connected to the rear brake pressure outlet port of a dual brake system master cylinder in a motor vehicle. The outlet opening 22 is hydraulically connected to supply fluid pressure to the slave cylinders of the rear wheel brakes. When the brake system master cylinder is inoperative, or when the system pressures are very low such as would occur when the brake shoes are advancing toward the brake drums, the component parts of the valve are spring biased to the predetermined positions shown in FIG. 1. When the component parts of the valve are in these positions, open fluid pressure communications is established between the inlet opening 18 and the outlet opening 22 through the passages 17, 51, 36, 42 and 23. During this portion of the operation of the valve, the inlet port pressure and the outlet port pressure of the valve are equal. This portion of the operation of the valve is shown graphically in FIG. 2 by line OA.

As the inlet and outlet pressures are increasing along line OA, a differential force on differential area piston 28 tends to move the differential area piston 28 from the position shown in FIG. 1 toward the left against the bias of coil spring 43. This differential force is created by fluid pressure acting upon the area differential of the piston 28 between the smaller diameter portion 29 and the larger diameter portion 31. When this differential force is great enough to overcome the preload of the spring 43, the differential area piston 28 moves toward the left so that the valve head 49 moves to a position in which it cooperates with the valve seat 64. This occurs at a first predetermined inlet port pressure indicated at point A in FIG. 2. This portion of the operation of the valve is substantially similar to that of the valve disclosed in U.S. letters Pat. No 3,623,776 to Ellis M. Wellman.

To understand the operation of the valve. it is helpful to understand the forces which are acting on the differential area piston 28 when it is displaced from the position shown in FIG. 1. The total force urging the differential area piston 28 to the right is the sum of the force F created by spring 43 and the force $P_I A_I$ of the inlet port pressure $P_I$ acting on the effective cross sectional area $A_I$ of the differential area piston 28 exposed to inlet port pressure. The only force urging the differential area piston 28 to the left is the force $P_0A_0$ of the outlet port pressure $P_0$ acting on the effective cross sectional area $A_0$ of the piston 28 exposed to outlet port pressure. The following equation equates the forces urging the piston 28 to the right with the forces urging the piston 28 to the left.

$$P_I A_I + F = P_0 A_0$$

When the forces on either side of this equation become greater than those on the other side of the equation, the piston 28 will move to the right or left and seek to balance this equation.

Figure 2:
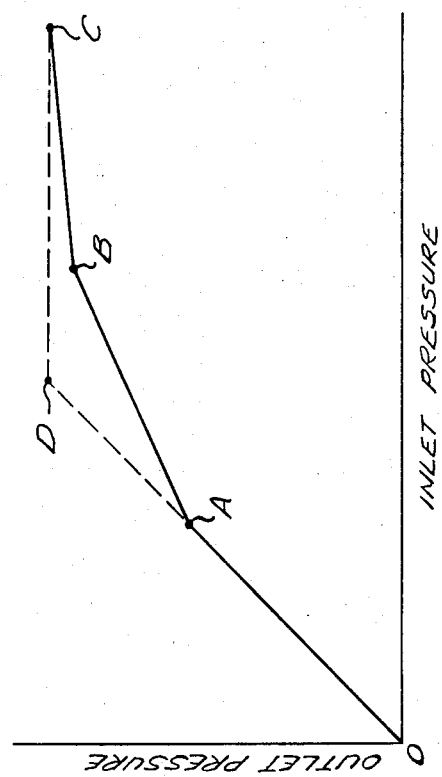
FIG. 2 is a graphical representation of the relationship between inlet and outlet port pressure of the valve shown in FIG. 1.

As the inlet port pressure increases above the pressure indicated at point A in FIG. 2, the area $A_I$ exposed to inlet port pressure is equal to the difference between the cross sectional area of the valve head 49 and the cross sectional area of the bore 11. The area $A_0$ exposed to outlet port pressure is equal to the difference between the cross sectional area of the valve head 49 and the cross sectional area of the counterbore 12. Because $A_0$ is larger than $A_I$, any increase in inlet port pressure $P_I$ creates a proportional but smaller increase in outlet port pressure $P_0$ to satisfy the above equation. This maintains a first predetermined proportional relation between increases in inlet port pressure and increases in outlet port pressure above the pressures indicated at point A as shown by line AB in FIG. 2.

It may be noted that the spring 54 has a sufficiently high preload to maintain he shoulder 56 against the shoulder 57 during this portion of the operation of the valve along line AB. Therefore, because the fluid pressure in the annular volume 58 exerts equal forces to the right and to the left on the composite of the differential area piston 28 and the valve head 49, the fluid pressure in the annular volume 58 will not effect this portion of the operation of the valve.

As the inlet and outlet port pressures are increasing along line AB, the valve permits unlimited fluid flow from the inlet opening 18 to the outlet opening 22 while maintaining the first predetermined proportional relation between increases in inlet port pressure and increases in outlet port pressure. If the fluid flow rate through the valve is substantially zero, the valve head 49 engages the valve seat 64 to hydraulically isolate the inlet opening 18 from the outlet opening 22. However, when any make-up flow is required downstream of the valve due to radial expansion of the lines, deformation of the brake structure or any other reason, differential area piston 28 and valve head 49 move slightly to the right in compliance with the above equation as the inlet port pressure $P_I$ increases. This establishes throttle fluid pressure communication between the inlet opening 18 and the outlet opening 22, with the pressure drop between the inlet and outlet openings occuring across the cooperating valve members 49 and 64.

As the system pressures are increasing along line AB, equal areas of the valve head 49 are exposed to inlet and outlet pressures. As point B is approached, the greater inlet port pressure $P_I$ acting on the valve head 49 creates a force sufficiently larger than the smaller outlet port pressure $P_0$ acting on the valve head 49 to begin to move the valve head 49 to the right away from the valve seat 64 against the bias of spring 54. When this occurs, the outlet port pressure $P_0$ begins to increase. This results in the differential area piston 28 beginning to move to the left as viewed in FIG. 1 because the slightly increased pressure $P_0$ tends to create an unbalanced force on the piston 28 as seen from the above equation. At point B, the valve head 35 has moved to the left so that it is in position to cooperate with the valve seat 64. After the valve head 35 moves to this position, the valve head 49 completes its movement to the right as viewed in FIG. 1 until it engages the abutment 55. This movement of the valve head 49 from a position adjacent the valve seat 64 to a position in which it engages member 55 may cause a slight increase in the volume of the outlet port due to the difference between the diameter of the seal 52 and the seal 53. This decrease in the volume of the outlet port may provide make-up flow to compensate for radial expansion of the brake lines or deformation of seals or brake structure.

Once valve head 35 has moved to the left and valve head 49 has moved to the right at point B, the effective cross sectional area $A_I$ of the piston 28 exposed to inlet port pressure $P_I$ is equal to the difference between the cross sectional area of the valve head 35 and the cross sectional area of the bore 11. The effective cross sectional area $A_0$ exposed to outlet port pressure $P_0$ is equal to the difference between the cross sectional area of the valve head 35 and the cross sectional area of the counterbore 12. Therefore, when point B is reached, the areas $A_I$ and $A_0$ both decrease, while the pressures $P_I$ and $P_0$ remain substantially constant. The areas $A_I$ and $A_0$ and the force F may be arranged to still satisfy the above described equation at point B so that a smooth transition at point B is maintained.

Because the area $A_0$ is larger than the area $A_I$ after point B has been reached, any increase in inlet port pressure $P_I$ creates a proportional but smaller increase in outlet port pressure $P_0$ to satisfy the above equation. This maintains a second predetermined proportional relation between increases in inlet port pressure and increases in outlet port pressure above the pressures indicated at point B as indicated by line BC in FIG. 2.

It may be noted that the shoulder 56 of valve head 49 is held against the shoulder 57 during this portion of the operation of the valve along line BC. Therefore, because the fluid pressure in the annular volume 58 exerts equal forces to the right and to the left on the composite of the differential area piston 28 and the valve head 49, the fluid pressure in the annular volume 58 will not effect this portion of the operation of the valve.

As the inlet and outlet port pressures are increased along line BC, the valve permits unlimited fluid flow from the inlet opening 18 to the outlet opening 22 while maintaining the second predetermined proportional relation between increases in inlet port pressure and increases in outlet port pressure. If the fluid flow rate through the valve is substantially zero, the valve head 35 engages the valve seat 64 to hydraulically isolate the inlet opening 18 from the outlet opening 22. However, When any make-up flow is required downstream of the valve due to radial expansion of the lines, deformation of the brake structure or any other reason, the valve head 35 is moved slightly to the right in compliance with the above equation as the inlet port pressure $P_I$ increases. This establishes throttled fluid pressure communication between the inlet opening 18 and the outlet opening 22, with the pressure drop between the inlet and outlet openings occurring across the cooperating valve members 35 and 64.

After point C has been reached and the pressure supplied to the inlet opening 18 from the master cylinder is subsequently decreased, the outlet pressure will remain substantially constant as the inlet pressure decreases until point D is reached, as shown graphically by line CD in FIG. 2. The line CD represents a constant pressure condition and intersects an extension of the line OA at point D. This is because the valve head 35 of the differential area piston 29 is held firmly against the valve seat 64 by the outlet pressure acting on the larger annular area $A_O$ of the differential area piston 29 between the counterbore 12 and the valve 35 as the inlet pressure decreases. When the inlet pressure $P_I$ decreases below the pressure at which it exceeds the outlet pressure $P_O$ by an amount sufficient to maintain the valve head 49 in its rightward position against the bias of spring 54, the valve head 49 moves the left and engages the valve seat 64. This increases the volume of the outlet port slightly, but does not substantially decrease pressure in the outlet port because this volume is compensated for by radial contraction of the lines, and deformation of the seals and brake structure.

When point D is reached and the inlet pressure is further decreased, the outlet pressure forces the valve 71 against the bias of spring 69. This permits the outlet pressure to decrease below the pressure indicated at point D so that inlet and outlet pressures will decrease along line DAO and the differential area piston 28 and valve head 49 will return to their spring biased positions shown in FIG. 1.

If the master cylinder pressure supplied to the inlet opening 18 is decreased when the valve is operating at any point along line AB, the outlet pressure will remain substantially constant as the inlet pressure decreases until a point along AD is reached. This is because the valve head 49 is held firmly against the valve seat 64 by the outlet pressure acting of the larger annular area of piston 28 between the counterbore 12 and the valve head 49 as the inlet pressure decreases. When the point along line AD is reached and the inlet pressure is further decreased, the outlet pressure forces the check valve 71 against the bias of spring 69. This permits the inlet and outlet pressures to decrease along line DAO, and the piston 28 and valve head 49 will return to their spring biased positions shown in FIG. 1.

If the fluid pressure supplied to the inlet opening 18 is decreased before the system pressures indicated at point A of FIG. 2 are reached, the inlet and outlet pressures of the valve will decrease along line OA, and the valve will not interrupt free fluid pressure communication between inlet and outlet.

Although the presently preferred embodiment of the invention has been disclosed and described in detail, it is understood that various modifications and rearrangements may be employed such as incorporating the unit into the master cylinder, the brake warning switch unit or the like. Such rearrangements and modifications as may become apparent to those skilled in the art upon a full understanding of this invention may be resorted to without departing from he scope of the invention as defined by the claims.

I claim:

1. A valve comprising a body having a bore therethrough, an inlet port at one end of said bore and an outlet port at the other end of said bore, a differential area piston slidably disposed in said bore, said differential area piston including differential area means, said differential area means including a smaller diameter portion of said differential area piston sealingly engaging one portion of said bore and a larger diameter portion of said differential area piston sealingly engaging another portion of said bore, a first spring biasing said differential area piston to a first position in said bore, a passage extending axially at least partially through said differential area piston establishing open fluid pressure communication between said inlet port and said outlet port when the fluid pressure in said inlet port is less than a first predetermined pressure, a first valve head disposed in said bore and carried by said differential area piston, a second annular valve head having a larger diameter than said first valve head on said differential area piston surrounding said passage, valve seat means disposed in said bore, said differential area means moving said differential area piston axially in one direction from said first position to a second position in which said first valve head engages said valve seat means to close said passage and isolate said inlet port from said outlet port when said first predetermined pressure obtains, said differential area means maintaining increases in said inlet port pressure above said first predetermined inlet port pressure and below a second predetermined inlet port pressure in a first predetermined proportional relation to increases in said outlet port pressure, said differential area means further moving said differential area piston axially in said one direction from said second predetermined position to a third predetermined position in which said second valve head engages said valve seat means to close said passage and isolate said inlet port from said outlet port when said second predetermined inlet port pressure obtains, and said differential area means maintaining increases in said inlet port pressure above said second predetermined pressure in a second predetermined proportional relation to increases in said outlet port pressure.

2. A valve as set forth in claim 1 wherein said first predetermined proportional relation is equal to the proportional relation between a first area differential and a second area differential, said first area differential being the difference between the cross sectional area of said other portion of said bore and the cross sectional area of said first valve head, and said second area differentail being the difference between the cross sectional area of said one portion of said bore and the cross sectional area of said first valve head.

3. A valve as set forth in claim 1 wherein said second predetermined proportional relation is equal to the proportional relation between a first area differential and a second area differential, said first area differential being the difference between the cross sectional area of said other portion of said bore and the cross sectional area of said second valve head, and said second area differential being the difference between the cross sectional area of said one portion of said bore and the cross sectional area of said second valve head.

4. A valve as set forth in claim 1 wherein said first valve head is slidably carried in said passage, and said first valve head includes a first portion exposed to inlet port pressure and a second portion exposed to outlet port pressure.

5. A valve as set forth in claim 4 wherein said first valve head is positioned closer to said valve seat means than said second valve head when said inlet port pressure is less than said first predetermined pressure, and said first valve head is movable away from said valve seat means by operation of said proportional inlet and outlet port pressures acting on said first and second portions respectively when said second predetermined inlet port pressure is reached.

6. A valve as set forth in claim 4 wherein said first valve head is biased by a second spring to a position closer to said valve seat means than said second valve head when said inlet port pressure is less than said first predetermined pressure, and said first valve head is movable against the bias of said second spring away from said valve seat means by operation of said proportional inlet and outlet port pressures acting on said first and second portions respectively when said second predetermined inlet port pressure is reached.

7. A valve as set forth in claim 4 wherein said first valve head is annular and includes another passage extending therethrough establishing open fluid pressure communication between said inlet port and said outlet port.

8. A valve as set forth in claim 7 wherein said first valve head is of smaller diameter than said second valve head.

9. A valve as set forth in claim 8 wherein said first and second valve heads are coaxially and concentrically disposed in said bore.

10. A valve comprising a body having a bore therethrough, an inlet port at one end of said bore and an outlet port at the other end of said bore, a differential area piston slidably disposed in said bore, said differential area piston including differential area means, said differential area means including a smaller diameter portion of said differential area piston sealingly engaging one portion of said bore and a larger diameter portion of said differential area piston sealingly engaging another portion of said bore, a first spring biasing said differential area piston to a first position in said bore, a passage extending axially at least partially through said differential area piston establishing open fluid pressure communication between said inlet port and said outlet port when the fluid pressure in said fluid inlet port is less than a first predetermined pressure, a first annular valve head disposed in said bore and carried by said differential area piston, a second annular valve head having a larger diameter than said first valve head on said differential area piston surrounding said passage, valve seat means disposed in said bore, said differential area means moving said differential area piston axially in one direction toward said inlet port from said first position to a second position in which said first valve head engages said valve seat means to close said passage and isolate said inlet port from said outlet port when said first predetermined pressure obtains, said differential area means maintaining increases in said inlet port pressure above said first predetermined inlet port pressure and below a second predetermined inlet port pressure in a first predetermined proportional relation to increases in said outlet port pressure when said differential area piston remains substantially stationary in said second position and the fluid flow rate from said inlet port to said outlet port is substantially zero, said differential area means moving said differential area piston axially in the other direction toward said outlet port to move said first valve head away from said valve seat means and open said passage when said inlet port pressure is above said first predetermined pressure and below said second predetermined pressure and the fluid flow rate from said inlet port to said outlet port is greater than zero whereby the fluid pressure drop from said inlet port to said outlet port occurs across said first valve head by operation of said differential area means, said first valve head being movable away from said valve seat means when said second predetermined inlet port pressure obtains, said differential area means further moving said differential area piston axially in said one direction from said second predetermined position to a third predetermined position in which said second valve head engages said valve seat means to close said passage and isolate said inlet port from said outlet port when said second predetermined inlet port pressure obtains, said differential area means maintaining increases in said inlet port pressure above said second predetermined pressure in a second predetermined proportional relation to increases in said outlet port pressure when said differential area piston remains substantially stationary in said third position and the fluid flow rate from said inlet port to said outlet port is substantially zero, and differential area means moving said differential area piston axially in said other direction toward said outlet port to move said second valve head away from said valve seat means and open said passage when said inlet port pressure is above said second predetermined pressure and the fluid flow rate from said inlet port to said outlet port is greater than zero whereby the fluid pressure drop from said inlet port to said outlet port occurs across said second valve head by operation of said differential area means.

11. A valve comprising a body having a bore therethrough, an inlet port at one end of said bore and an outlet port at the other end of said bore, a passage establishing open fluid pressure communication between said inlet port and said outlet port when said inlet port pressure is less than a first predetermined pressure, first valve means disposed in said bore, second valve means disposed in said bore, third valve means disposed in said bore, said second and third valve means each being axially spaced away from said first valve means when said inlet port pressure is less than said first predetermined pressure and each being axially movable toward and away from said first valve means, differential area means moving said second valve means axially toward said first valve means when said first predetermined inlet port pressure is reached, said first and second valve means together at least partially closing said passage and modulating fluid flow from said inlet port to said outlet port and maintaining increases in outlet port pressure in a first predetermined proportional relation to increases in inlet port pressure when said inlet port pressure is greater than said first predetermined pressure and less than a second predetermined inlet port pressure, means separating said first and second valve means and rendering said first and second valve means inoperable to modulate fluid flow when said second predetermined inlet port pressure is reached, said first and third valve means together at least partially closing said passage and modulating fluid flow from said inlet port to said outlet port and maintaining increases in outlet port pressure in a second predetermined proportional relation to increases in inlet port pressure when said inlet port pressure is greater than said second predetermined pressure.

12. A valve as set forth in claim 11 wherein said first valve means is a valve seat member, said third valve means is an annular valve head surrounding a passage extending from one end face of differential area piston, and said passage provides fluid pressure communication between said inlet port and said outlet port when said inlet port pressure is less than said first predetermined pressure.

13. A valve as set forth in claim 12 wherein said second valve means is another annular valve head surrounding said passage, said other annular valve head being slidably carried by said differential area piston, and said other annular valve head being spring biased to a position closer to said valve seat member than said first mentioned annular valve head when said inlet port pressure is less than said first predetermined pressure.

14. A valve comprising a body having a bore therethrough, an inlet port at one end of said bore and an outlet port at the other end of said bore, a passage establishing open fluid pressure communication between said inlet port and said outlet port when said inlet port pressure is less than a first predetermined pressure, first valve means disposed in said bore, second valve means disposd in said bore, said first valve means modulating fluid flow from said inlet port to said outlet port and maintaining increases in outlet port pressure in a first predetermined proportional relation to increases in inlet port pressure when said inlet port pressure is greater than said first predetermined pressure and less than a second predetermined inlet port pressure, means rendering said first valve means inoperable to modulate fluid flow when said second predetermined inlet port pressure is reached, said second valve means modulating fluid flow from said inlet port to said outlet port and maintaining increases in outlet port pressure in a second predetermined proportional relation to increases in inlet port pressure when said inlet port pressure is greater than said second predetermined pressure.

* * * * *

UNITED STATES PATENT OFFICE
CERTIFICATE OF CORRECTION

Patent No. 3,771,837     Dated November 13, 1973

Inventor(s) Tadeusz Budzich

It is certified that error appears in the above-identified patent and that said Letters Patent are hereby corrected as shown below:

Column 1, line 13, change "automaobile" to -- automobile --.

Column 2, line 27, after "outlet" insert -- port --.

Column 3, line 14, change "threre-" to -- there- --.

Column 3, line 20, change "inverred" to -- inverted --.

Column 5, line 29, change "he" to -- the --.

Column 7, line 15, after "moves" insert -- to --.

Column 7, line 22, after "forces the" insert -- check --.

Column 7, line 58, change "he" to -- the --.

Column 8, line 44, change "differentail" to -- differential --.

Signed and sealed this 4th day of June 1974.

(SEAL)
Attest:

EDWARD M. FLETCHER, JR.
Attesting Officer

C. MARSHALL DANN
Commissioner of Patents